Jan. 27, 1925.

G. DOD

STENTER CHAIN

Filed Aug. 12, 1924

Inventor:-
Gerald Dod
By his Attorney:- Walter Gunn.

Patented Jan. 27, 1925.

1,524,027

UNITED STATES PATENT OFFICE.

GERALD DOD, OF SOUTHPORT, ENGLAND.

STENTER CHAIN.

Application filed August 12, 1924. Serial No. 731,643.

*To all whom it may concern:*

Be it known that I, GERALD DOD, a subject of the King of Great Britain and Ireland, residing at Southport, England, have invented new and useful Improvements in or Relating to Stenter Chains, of which the following is a specification.

This invention refers to the pins by which the links of stenter chains are pivotally connected one to another. Heretofore, these pins have usually consisted of a mild steel pin with one end enlarged, and the other end plain but after insertion in the links, riveted over. To allow of riveting over, the pins cannot be hardened and consequently they soon work loose and require frequent replacement.

To renew the pins it is necessary to cut away the rivet head of the old pin, and to raise the chain to remove the worn pin and insert the new pin.

Lubrication of the pins is dependent on oil obtained from the underside of the chain, which has to find its way upwards through the holes in the links. The oil is sometimes inadequate and at other times there is too much oil, especially when the pin is worn, when the oil is liable to be squirted on to the top surface of the chain and on to the fabric.

Hardened steel pins with a collar and hardened steel bush to help to fix same have been proposed as also case hardened steel pins with cap to fix same. Neither arrangement has been satisfactory and in the latter instance after the case hardening is worn away, the pins are no better than the ordinary mild steel riveted pins. To make the proposed arrangements of case-hardened pins of hardened steel throughout from the bar would be too expensive.

The present invention has for its object to provide a form of pin, and means for fixing same, which will remove the drawbacks before named, while also allowing of the pin being made of hardened steel throughout, at comparatively low cost.

According to the invention, the improved pin is made from a round steel rod preferably finished to the required diameter of pin, and also cut off to the required length. One, the upper end of the pin is formed to a conical or like shape, while the lower end is also formed conical or parallel-sided. The lower end of the pin fits a corresponding aperture in the lower jaw of the chain link, or in a bush fixed in said aperture, while the upper conical end projects into an aperture in the upper jaw of the chain link, said aperture being of larger diameter than the pin by an amount equal to the thickness of a ferrule adapted to fit and fill the space between the pin and the inner face of the aperture. After passing the pin preferably from the top side of the chain into the links, the ferrule is inserted into the aperture either by screwing, or by direct end pressure, the metal of the ferrule being of a fairly ductile kind so that by the time it is fully "home" it partakes of the shape of the coned end of the pin, and thereby forms a conical seating for the upper end of the pin, only such end pressure being put on the pin by the ferrule as to hold it against rotation without putting a strain on the jaws of the chain link.

The pin may be made hollow throughout, or bored from its upper or lower end and provided with holes radiating downwards from the centre bore for the purpose of conveying lubricant to the outer face of the pin against which the usual bush or liner bears.

The invention will be more particularly described by the aid of the accompanying drawings, in which;

Fig. 1 shows in elevation, a link with one end in section showing the invention applied.

Fig. 2 is a sectional view of the ends of two adjacent links showing a modified form of the invention.

Fig. 3 shows the ferrule before being forced into the link.

Figs. 4 and 5 are views corresponding to Figs. 2 and 3 respectively showing a modified form of the invention.

Figs. 6, 7, 8, 9 and 13 show five further modified forms of the invention, while Figs. 10, 11 and 12 show three ways of forming the top of the ferrule, and Figs. 14, 15 and 16 are sectional views of the improved pin hollowed out for lubricating purposes.

Figs. 17 and 18 show the top end of two further slightly modified pins.

In carrying out the invention in one convenient form as illustrated in Fig. 1, the pin $a$ is formed conical at both ends its overall length being about equal to the thickness of a chain link $b$. The aperture $b'$ in the lower jaw of the link is conical to receive the coned end of the pin $a$, and the aperture $b^2$ in the upper jaw is parallel sided and screw threaded to receive a screw-threaded ferrule $c$, this latter, on being screwed into the aperture being adapted to take up the shape of the pin, on its inner face, the bottom edge of the ferrule meeting the top face of the bush $d$ in the adjacent link $e$ when the screwed part has entered the aperture $b^2$ to the required extent and the pin $a$ then being firmly held endwise without putting a strain on the jaws of the link.

In another example of the invention illustrated in Figs. 2 and 3, the aperture $b^2$ in the top jaw of the link $b$ is formed conical and to a like taper as the end of the pin $a$ further, the ferrule $c'$ which is made parallel sided and plain (not screw-threaded), see Fig. 3, is forced into the recess between the coned end of the pin $a$ and the sides of the aperture $b^2$ thereby causing it to spread outwards and fill the said space, both the inner and outer faces of the ferrule then being conical and the inner face forming the desired seating for the end of the pin, while the outer face of the ferrule serves to lock the ferrule to the link jaw as clearly seen in Fig. 2.

In a further example of the invention shown in Fig. 4, the aperture $b^2$ in the top link jaw is both tapered and screw threaded and the ferrule, which is parallel sided at first as seen in Fig. 5, is also screw threaded on its exterior, so that on screwing the ferrule into position, it worms itself into the aperture and simultaneously expands as its inner face meets the coned end of the pin $a$. Instead of being screw threaded on its exterior, the ferrule may be screw-threaded on its interior and the coned end of the pin $a'$ be likewise screw-threaded as illustrated in Fig. 6.

In a still further example of the invention shown in Fig. 7, the lower end of the pin $a^2$ is left parallel-sided, and is fitted into a bush $f$ fixed in a parallel-sided aperture formed in the lower link jaw, the pin $a^2$ being either a dead fit, or there being a spring washer $g$ between the pin and bush to take up any slack. Instead of being parallel-sided, the lower end of the pin $a^2$ may be coned and fit a like coned recess in the bush $h$ as illustrated in Fig. 8.

The ferrule may be turned to the required shape or it may be made from tubing folded back on itself at one end, and the other end adapted to enter the space between the pin and link jaw and Fig. 9 illustrates such a construction.

The ferrules may be hexagonal in plan, see Fig. 10, formed with peripheral or cross slots as shown in Figs. 11 and 12 respectively, or otherwise shaped to facilitate handling and to remove a pin from the links, the ferrule is extracted by unscrewing or by drawing it bodily out of the link, the metal being sufficiently ductile to allow this, and the ferrule, in fact, being inserted, removed, and reinstated as many times as the pin is removed.

Instead of being in one piece, the upper coned end $a^3$ of the pin $a$ may be separate from the lower part, as shown in Fig. 13 where said lower part is bored to receive a small central spigot $a^4$ on the coned end $a^3$.

In all cases the pin $a$ may be hollow from end to end, as seen in Fig. 14, or for a portion of its length in which case side openings are provided for oil to flow to the bearing, see Fig. 15. If desired, the opening at the top may be enlarged to receive "wick" to hold oil, such a construction being illustrated in Fig. 16 which also shows suitable radiating holes to deliver the oil to the outer face of the pin.

Instead of the pins $a$ being tapered from the extreme end, the end may be parallel and formed to the middle part of the pin $a$ with a tapered portion as seen in Fig. 17. Further, instead of a straight tapered or coned end, said reduced end may be convex, or concave as shown in Fig. 18.

With the pin made from a rod of one diameter, i. e. without a flange or head part, it can be made of hardened steel throughout at low cost, and by the use of a hardened throughout steel pin, a much more durable link connection is provided. Further, by reason of the pin being insertable from the top side of the chain, no lifting of the chain is necessary, and with the pin drilled to receive and distribute oil, the pin is efficiently lubricated.

What I claim is:—

1. In stenter chains, a link with upper and lower jaws at one end, a further link with single projection at one end fitting between the jaws of the first named link, said jaws and projection having holes through them, a hardened steel pivot pin in said holes, the upper end of which is conical, a steel bush in the hole of the link projection, a further but ductile metal bush with conical recess fitting the conical upper end of the pin, and also fitting tightly in the hole of the upper link jaw, the lower end of the pin fitting the hole in the lower link jaw, as set forth.

2. In stenter chains, a link with upper and lower jaws at one end, a further link with single projection at one end fitting between the jaws of the first named link, said jaws and projection having holes through them, a hollow hardened steel pivot pin in said holes, the upper end of which is conical, a steel bush in the hole of the link projection, a further but ductile metal bush with conical recess fitting the conical upper end of the pin, and also fitting tightly in the hole of the upper link jaw, the lower end of the pin fitting the hole in the lower link jaw, as set forth.

3. In stenter chains, a link with upper and lower jaws at one end, a further link with single projection at one end fitting between the jaws of the first named link, said jaws and projection having holes through them, a hardened steel pivot pin in said holes, the upper end of which is conical, a steel bush in the hole of the link projection, a further but ductile metal bush with conical recess fitting the conical upper end of the pin, and also fitting tightly in the hole of the upper link jaw, the lower end of the pin fitting the hole in the lower link jaw, and said pin having a central boring extending from its lower end to a point near its upper end and at such point having lateral passages communicating with the exterior of the pin, as set forth.

In testimony whereof I have signed my name to this specification.

GERALD DOD.